(12) United States Patent
Koyama et al.

(10) Patent No.: US 7,586,715 B2
(45) Date of Patent: Sep. 8, 2009

(54) MAGNETIC HEAD WITH A NARROW SPACING BETWEEN MAGNETIC SHIELDS AT AIR BEARING SURFACE

(75) Inventors: Naoki Koyama, Tokyo (JP); Kouji Okazaki, Kanagawa (JP); Izuru Ishii, Kanagawa (JP); Shuichi Kojima, Kanagawa (JP); Shigeru Tadokoro, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 377 days.

(21) Appl. No.: 11/336,185

(22) Filed: Jan. 20, 2006

(65) Prior Publication Data

US 2006/0158789 A1    Jul. 20, 2006

(30) Foreign Application Priority Data

Jan. 20, 2005    (JP)    ............................... 2005-012361

(51) Int. Cl.
    *G11B 5/39*    (2006.01)
(52) U.S. Cl. .................................................... 360/321
(58) Field of Classification Search ................ 360/321, 360/324.12, 319, 322
    See application file for complete search history.

(56) References Cited

U.S. PATENT DOCUMENTS

| 5,617,277 | A | * | 4/1997 | Chen et al. .................. 360/320 |
| 5,675,459 | A | * | 10/1997 | Sato et al. .................... 360/325 |
| 6,185,078 | B1 | * | 2/2001 | Lin et al. ............... 360/324.12 |
| 6,525,913 | B1 | * | 2/2003 | Mauri et al. ................. 360/320 |
| 6,614,629 | B1 | * | 9/2003 | Kakihara ................. 360/324.1 |
| 6,751,071 | B2 | * | 6/2004 | Yazawa et al. ............... 360/319 |
| 6,930,864 | B2 | * | 8/2005 | Santini ....................... 360/322 |
| 7,123,454 | B2 | * | 10/2006 | Takano ................... 360/324.12 |
| 7,187,524 | B2 | * | 3/2007 | Lin et al. ............... 360/324.12 |
| 7,280,321 | B2 | * | 10/2007 | Watanabe et al. ........... 360/320 |
| 7,301,734 | B2 | * | 11/2007 | Guo et al. .............. 360/324.11 |
| 2001/0010615 | A1 | * | 8/2001 | Yazawa et al. ............... 360/319 |
| 2001/0030840 | A1 | * | 10/2001 | Shiraki et al. ............... 360/317 |
| 2004/0125513 | A1 | | 7/2004 | Tanaka et al. |

* cited by examiner

*Primary Examiner*—Angel A. Castro
(74) *Attorney, Agent, or Firm*—Townsend and Townsend and Crew LLP; Rambod Nader

(57) ABSTRACT

Even if the track and gap widths are made narrow in a read head, a narrow track head has so far been unable to afford satisfactory off-track characteristics because of a wide shield spacing over electrodes. The invention provides a magnetic head wherein, in the height direction of a magnetoresistive element, the spacing between an upper magnetic shield and a lower magnetic shield at an air bearing surface is narrower than the spacing between the upper and lower magnetic shields formed over a thickest portion of each of electrodes in contact with associated magnetic domain control layers.

10 Claims, 14 Drawing Sheets

(a)

Element height direction
Track width direction
Air bearing surface

A'-A section (b)

B'-B section (c)

(a)

A'-A section (b)

B'-B section (c)

(a)

A'-A section (b)

B'-B section (c)

(a)

A'-A section (b)

B'-B section (c)

(a)

A'–A section
(b)

B'–B section
(c)

(a)

A'–A section (b)

B'–B section (c)

A'–A section (d)

A'–A section (e)

A'-A section

B'-B section (a)

A'-A section (b)

B'-B section (c)

(a)

A'-A section
(b)

B'-B section
(c)

(a)

A'-A section (b)

B'-B section (c)

A'-A section

B'-B section

MAGNETIC HEAD WITH A NARROW SPACING BETWEEN MAGNETIC SHIELDS AT AIR BEARING SURFACE

CROSS-REFERENCES TO RELATED APPLICATIONS

This application claims priority from Japanese Patent Application No. JP2005-012361, filed Jan. 20, 2005, the entire disclosure of which is incorporated herein by reference.

BACKGROUND OF THE INVENTION

The present invention relates to a magnetic head used in a magnetic recording device and more particularly to the structure of a magnetoresistive head used as a read head.

Recently, techniques for improving the surface recording density have been developed in order to attain high performance of magnetic recording devices. Improving the surface recording density needs to attain a high track density and a high linear recording density. In addition, it is essential to narrow the track width and read gap of read and write heads as magnetic heads.

The schematic structure of a conventional read head is shown in FIGS. 15 and 16. This read head includes a magnetoresistive element 1 (hereinafter referred to as "GMR element") using GMR effect as a read element, electrode layers 3 disposed at both the ends of the element 1 to supply electric power, and magnetic domain control layers 2 disposed at both ends of the element 1 to control magnetic domains of the read element. In addition, the read head includes upper and lower magnetic shield layers 5, 6 having soft magnetic characteristics which are disposed above and below the above-noted element and layers through insulating layers, respectively.

An effective track width of the read head is basically determined by a geometric track width of a GMR element which is defined as the distance between a pair of electrodes formed on the magnetic domain control layers. However, it is also influenced by the strength of magnetic domain control and the spacing between the magnetic shield layers. The electrodes and magnetic domain control layers are formed at the end portions in the track width direction of the GMR element. Therefore, the film thicknesses of the end portions are larger than that of the GMR element. Consequently, the spacing between the magnetic shield layers at the end portions becomes greater than at the central part in the track width direction. In particular, as the track width is made narrower, the geometric track width of the GMR element becomes narrower, so that the increased spacing between the magnetic shield layers becomes more influential, leading to a substantial increased track width. This phenomenon is called side reading at end portions of the read element. The phenomenon occurs in a distance range approximately equal to the spacing between the upper and lower magnetic shields in the read element height direction from an air bearing surface of the magnetic head. This causes deterioration of resolution at end portions of the geometric track width and cross talk with an adjacent track. Thus, the phenomenon in question is a serious problem in narrowing the track width.

As methods for avoiding this problem, various techniques are disclosed, for example, in Japanese Patent Laid-open Nos. 6-60326, 11-25431 and 2004-206842. The techniques include a technique of making electrodes and magnetic domain control layers as thin as possible and a technique of using thin electrodes to stepwise prevent an increase of the shield spacing.

BRIEF SUMMARY OF THE INVENTION

Thinning electrode layers and magnetic domain control layers results in a marked increase of electric resistance with consequent particular increase of noise. Moreover, the signal-to-noise ratio lowers and deterioration of characteristics results as a whole.

Accordingly, it is a feature of the present invention to provide a head structure capable of preventing an increase of the spacing between upper and lower magnetic shields at portions corresponding to electrodes formed at end portions in the track width direction of a read element without markedly thinning electrode layers and magnetic domain control layers, a read head free of deterioration of characteristics at end portions in the track width direction, and a magnetic head superior in read/write characteristics.

According to the present invention there is provided a magnetic head characterized in that, in the height direction of a magnetoresistive element, the spacing between an upper magnetic shield and a lower magnetic shield at an air bearing surface is narrower than the spacing between the upper and lower magnetic shields formed over a thickest portion of each of electrodes which are formed in contact with magnetic domain control layers. Alternatively, the thickness of each of electrodes at an air bearing surface is smaller than the thickness of a thickest portion of each of the electrodes. Further, as viewed from an air bearing surface of the magnetic head, the difference in height between an upper magnetic shield and an upper surface of a magnetoresistive element at air bearing surface portions where electrodes are provided is shorter than the difference in height between an upper surface of a thickest portion of each of the electrodes and the upper surface of the magnetoresistive element.

According to the present invention it is possible to provide a magnetic head free of side reading or deterioration of resolution and superior in read/write characteristics.

DETAILED DESCRIPTION OF THE INVENTION

Figure 1:
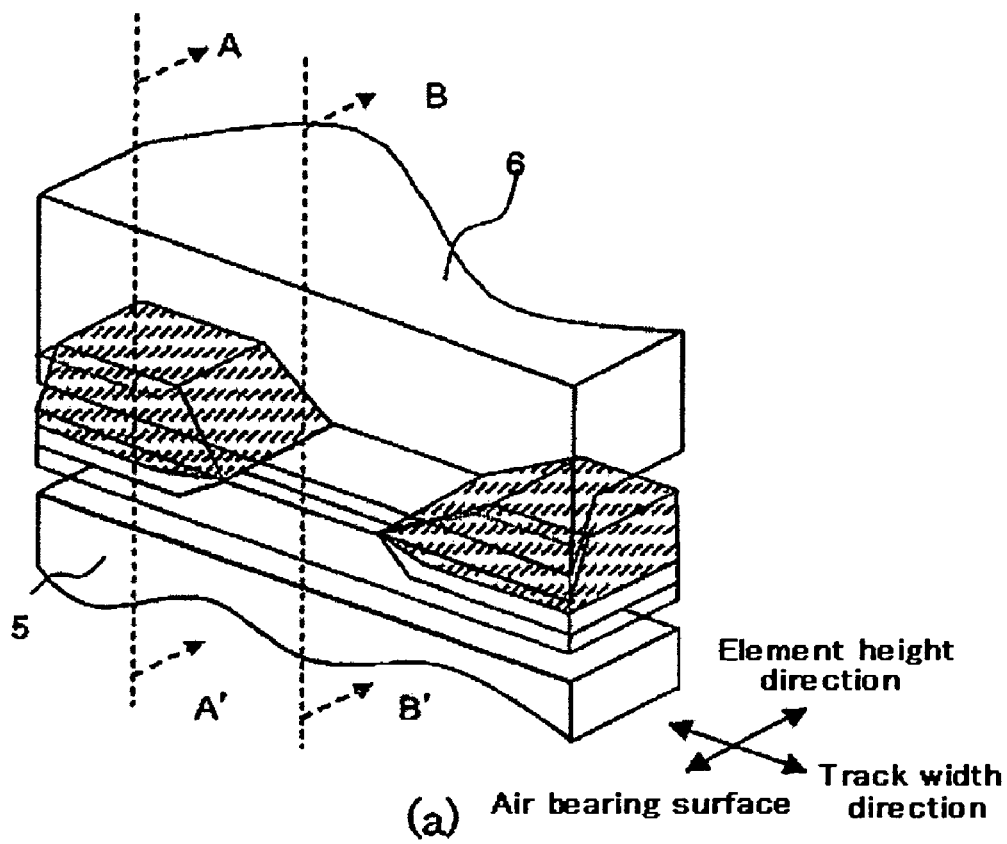
FIG. 1 shows a magnetic head according to a first embodiment of the present invention.
Figure 1:
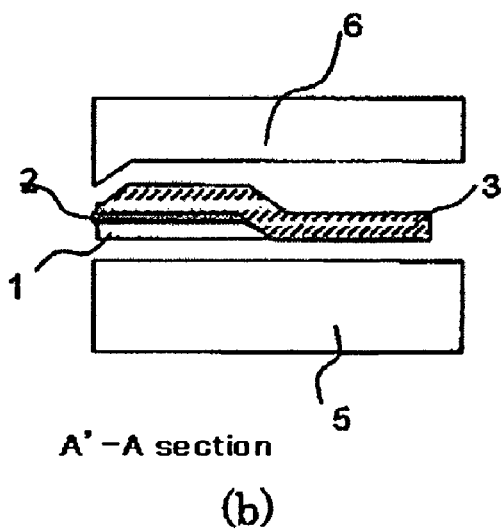
Figure 1:
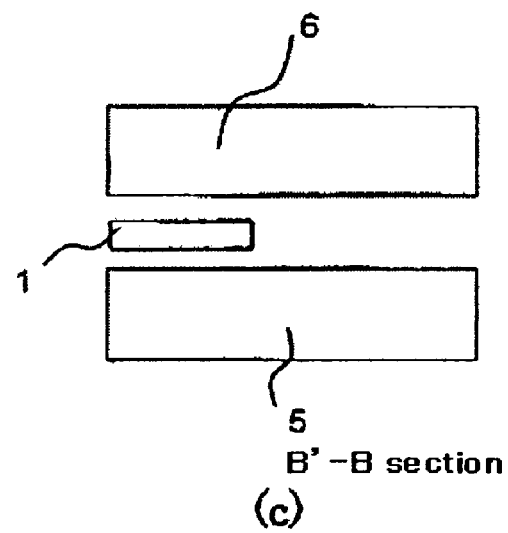

FIG. 1 shows a magnetic head according to a first embodiment of the present invention. FIG. 1 comprises a perspective view (FIG. 1(a)) of magnetic shields and a read head element portion obtained when a read head portion of a magnetic head slider is observed in the direction of an air bearing surface, a sectional view (FIG. 1(b)) taken along line A'-A in FIG. 1(a), and a sectional view (FIG. 1(c)) taken along line B'-B in FIG. 1(a). In the figures, a front surface of the magnetic head is assumed to be an air bearing surface. The depth direction of a magnetoresistive element (GMR element 1) relative to the air bearing surface is assumed to be "element height direction" and a track width direction of the magnetoresistive element (GMR element 1) is assumed to be "track width direction." This is also true of the drawings which follow.

First, as is seen from FIG. 1(a), with respect to a gap spacing between a lower magnetic shield 5 and an upper magnetic shield 6 at the air bearing surface, there is no difference between the central part and both end portions in the track width direction of the GMR element 1. That is, the upper and lower magnetic shields 5 and 6 are formed substantially in parallel with each other. As is seen from FIG. 1(b), the surface on the air bearing surface side of each of electrodes 3 in contact with magnetic domain control layers is inclined in a tapered shape, so that the upper magnetic shield 6 is formed along this inclination through an insulating film. That is, in the height direction of the GMR element, the spacing between the upper and lower magnetic shields 6, 5 at the air bearing surface is narrower than the spacing between the upper and lower magnetic shields 6, 5 formed over a thickest portion of each of the electrodes in contact with the magnetic domain control layers. Therefore, an increase of the gap spacing caused by the thickness of each electrode portion is mitigated and it is possible to suppress the expanse of the magnetic shields' spacing. Preferably, the spacing between the upper and lower magnetic shields 6, 5 is minimum relative to the air bearing surface when seen in the height direction of the GMR element 1. As the case may be, the electrodes 3 each have an electrically conductive underlying layer such as Cr or Ta layer at the portion in contact with the associated magnetic domain control layer.

By tapering the air bearing surface side of each of the electrodes in contact with the magnetic domain control layers, the spacing between the upper and lower magnetic shields in the vicinity of the air bearing surface of the magnetic head can be made still narrower in comparison with the case where electrode layers are further stacked on the electrodes. On the other hand, it is possible to ensure a required thickness of the electrodes spaced away from the air bearing surface in the element height direction. It is preferable that the above construction be applied within a distance range twice as large as the spacing between the upper and lower magnetic shields in the element height direction from the air bearing surface of the magnetoresistive element. As a result, it is possible to prevent deterioration of magnetic characteristics caused by an increase of the spacing between the upper and lower magnetic shields in the vicinity of the air bearing surface where side reading is apt to occur.

Reference will now be made to the structure of each electrode 3 in this embodiment. The thickness of each electrode 3 at the air bearing surface is smaller than the thickness of a thickest portion of the electrode. In other words, the thickness of the upper magnetic shield 6 is small over the thickest portion of the electrode and is large at the air bearing surface, so that the spacing between the upper and lower magnetic shields 6, 5 becomes so much narrower. Preferably, the thickness of each electrode 3 is minimum at the air bearing surface when viewed from the height direction of the GMR element 1.

As viewed from the air bearing surface direction, the difference in height between the upper magnetic shield 6 and an upper surface of the magnetoresistive element of the portion where each of the electrodes 3 is provided is smaller than the difference in height between an upper surface of the thickest portion of each electrode 3 and an upper surface of the GMR element.

As is seen from FIG. 1(c), the spacing between the upper and lower magnetic shields 5, 6 formed above and below the central part in the track width direction of the GMR element 1 is kept narrow in proportion to the absence of electrodes 3.

Figure 2:
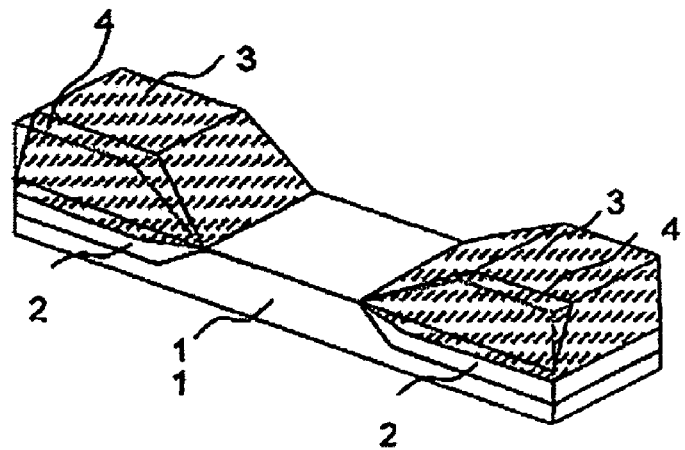
FIG. 2 shows a read head sandwiched in between upper and lower magnetic shields.

FIG. 2 shows a read head sandwiched in between the upper and lower magnetic shields 6, 5. As shown in FIG. 2, the read head element portion includes the GMR element 1, a pair of magnetic domain control layers 2 formed at both ends, in a track width direction, of GMR element 1, and a pair of electrodes 3 formed on the associated magnetic domain control layers 2. The GMR element 1 further has a free layer, a pinned layer and an antiferromagnetic layer pinning the pinned layer. At the end portions of the GMR element 1 in the track width direction thereof, the antiferromagnetic layer which underlies the GMR element 1 is allowed to remain, the magnetic domain control layers 2 are formed thereon, and further, the electrodes 3 are stacked on the magnetic domain control layers 2 so as to be in contact with the layers 2. Side faces 4 of the electrodes 3 facing the air bearing surface are tapered by etching, whereby the magnetic shield 6 formed along the side faces 4 partially covers the electrodes 3. Thereafter, when the electrodes are partially exposed by a subsequent slider work, the air bearing surface is formed which has the electrodes 3 partially covered with the magnetic shield 6.

Figure 18:
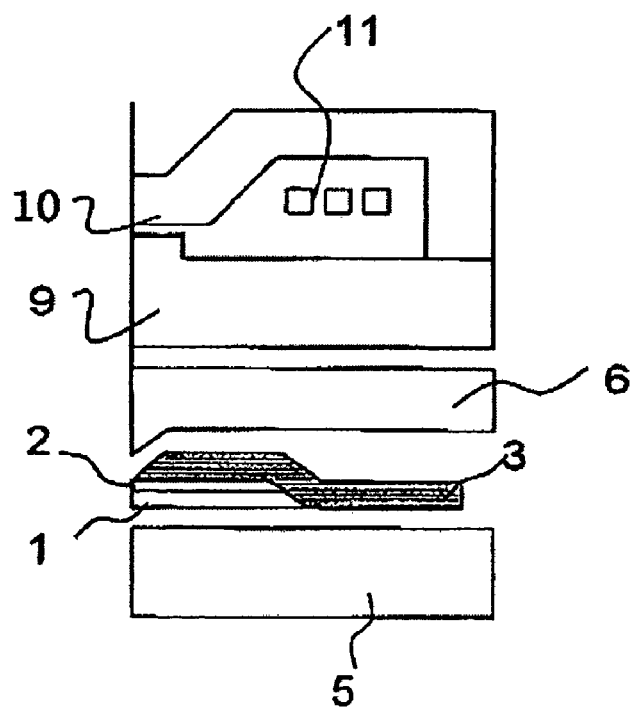
FIG. 18 is a sectional view of a magnetic head of a longitudinal magnetic recording type to which the read head of the first embodiment is applied.

FIG. 18 is a sectional view of a magnetic head of a longitudinal magnetic recording type to which the read head of this embodiment is applied. A write head forms a magnetic gap on an air bearing surface which faces a magnetic disk, the magnetic gap being formed by a lower magnetic pole 9 formed over the upper magnetic shield 6, an upper magnetic pole 10 formed over the lower magnetic pole 9, and a magnetic gap layer formed therebetween. A signal current is flowing in a coil 11. During write, a magnetic flux leaking from the write head returns to the magnetic head via a lower soft magnetic film of the magnetic disk and magnetizes a track on the magnetic disk in an in-plane direction.

Figure 19:
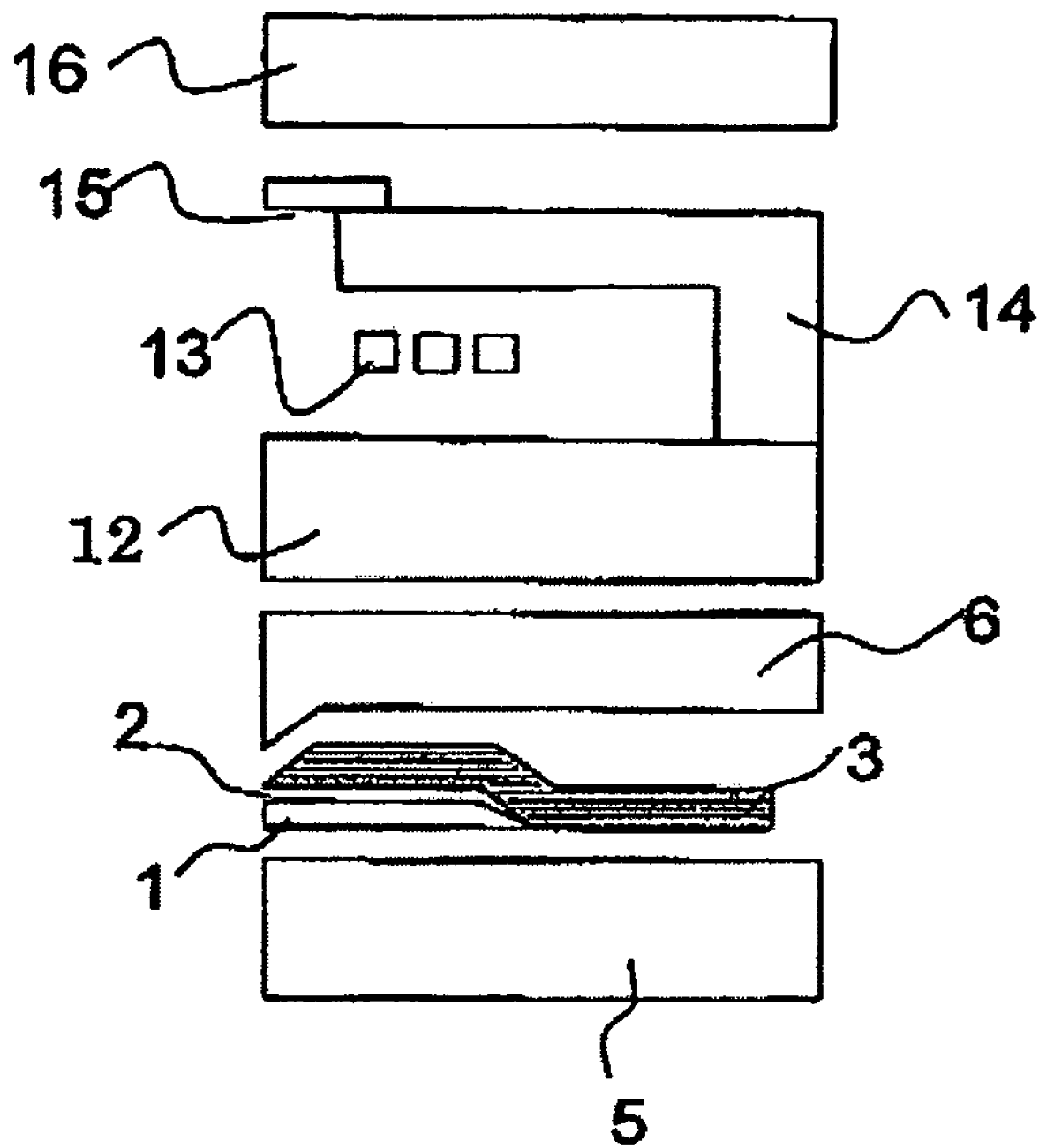
FIG. 19 is a sectional view of a magnetic head of a perpendicular magnetic recording type to which the read head of the first embodiment is applied.

FIG. 19 is a sectional view of a magnetic head of a perpendicular magnetic recording type to which the read head of this embodiment is applied. A sectional view illustrates a magnetic head of a longitudinal magnetic recording type to which the read head of this embodiment is applied. A write head forms a magnetic gap on an air bearing surface which faces a magnetic disk, the magnetic gap being formed by a closure magnetic pole 12 formed over an upper magnetic shield 6, a yoke magnetic pole 14 formed over the closure magnetic pole 12, a main magnetic pole 15 formed on an air bearing surface side of the yoke magnetic pole 14, and a magnetic gap layer formed among them. A signal current is flowing through a coil 13. During write, a magnetic flux leaking from the write head returns to the magnetic head via a lower soft magnetic film of the magnetic disk and magnetizes a track on the magnetic disk in a perpendicular direction.

Figure 3:
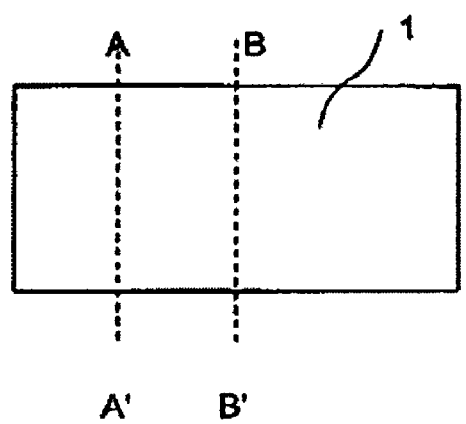
FIG. 3 shows a plan view and a sectional view of a GMR element formed in a rectangular shape in the first embodiment.
Figure 3:
Figure 3:
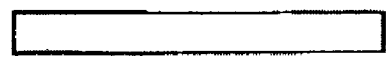

Next, a manufacturing process for the magnetic head according to this embodiment will be described in detail with reference to FIGS. 3 to 9. First, as shown in FIG. 3, a GMR element 1 is stacked on a lower magnetic shield 5 (not shown) of the magnetic head, followed by patterning in a rectangular shape. A planar shape after the patterning is shown in FIG. 3(a). In FIG. 3(a), a section taken on line A'-A is shown in FIG. 3(b) and a section taken on line B'-B is shown in FIG. 3(c). In FIG. 3(a), an upper end of the height of the GMR element 1 is determined by an upper side of the rectangular pattern. An insulating layer and a magnetic layer serving as the lower magnetic shield 5 underlie the GMR element 1, and a sintered substrate of alumina titanium carbide further underlies them though not shown. At this time, A'-A and B'-B sections are the same, representing a section of the GMR element 1. The GMR element 1 is constituted by stacking a NiFeCr underlying layer, a PtMn antiferromagnetic layer, a first pinned layer, a Ru film, a second pinned layer, a Cu layer, two free layers, and a cap layer, successively in this order from below.

Figure 4:
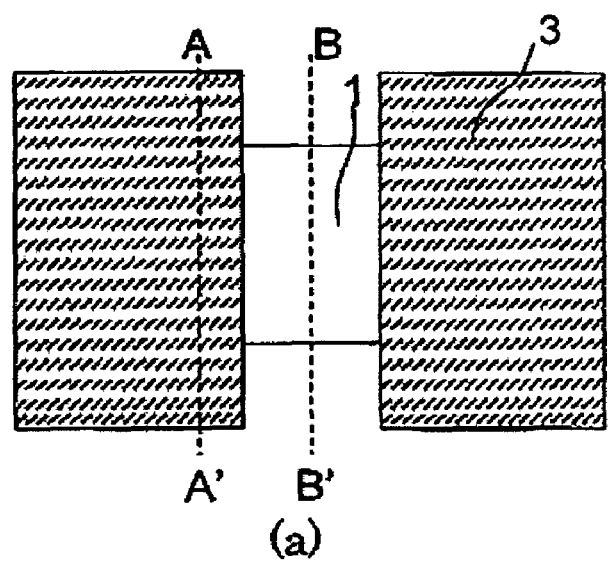
FIG. 4 shows a plan view and a sectional view showing a state in which magnetic domain control layers and electrodes are formed on both sides of the GMR element in the first embodiment.
Figure 4:
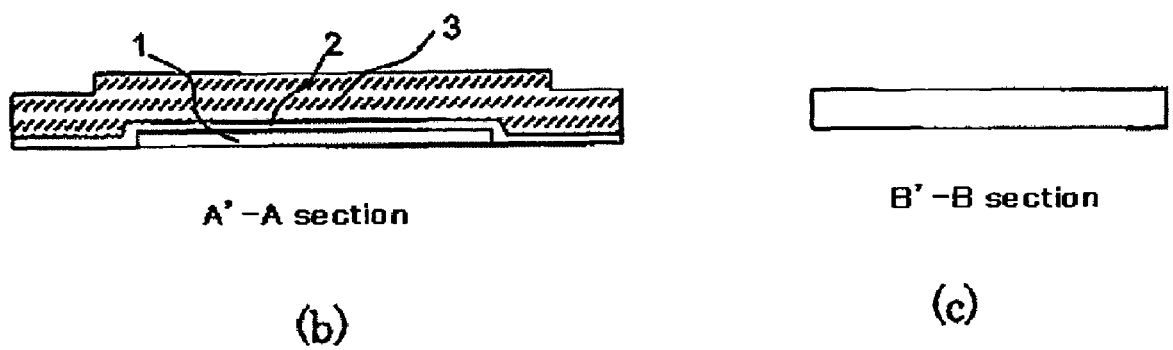

In FIG. 4, FIG. 4(a) shows a planar shape obtained when magnetic domain control layers 2 and electrodes 3 are formed on both sides of the GMR element 1. In FIG. 4(a), a section taken on line A'-A is shown in FIG. 4(b) and a section taken on line B'-B is shown in FIG. 4(c). A GMR element width in the track width direction and a geometric track width are determined by this process. The magnetic domain control layers 2 are permanent magnets of CoCrPt, each having a thickness of 20 nm, and the electrodes 3 are formed of Rh and each have a thickness of 50 nm. That is, it is preferable to use electrodes each having a thickness of 50 nm or more in order to prevent the occurrence of noise caused by an increase of resistance value attributable to the reduction in thickness of electrodes. The spacing between the electrodes 3 positioned at both ends in the track width direction of the GMR element 1 is 100 nm, which corresponds to the geometric track width of the read element. The magnetic domain control layers 2 and the electrodes 3 in this process are formed by a lift-off method. According to the lift-off method, a photoresist is formed beforehand in a desired portion serving as a track width on the GMR element 1 and with the photoresist as a mask, the GMR 1 is etched in electrode-forming portions. In this case, a lower layer portion of the GMR 1 element is left unetched for maintaining height in the thickness direction in forming the magnetic domain control layers 2. Next, with the resist mask left intact, the magnetic domain control layers 2 and electrodes 3 are formed. Thereafter, the photoresist is peeled and melted, whereby the magnetic domain control layers 2 and electrodes 3 in the track width portion where the photoresist has been present are removed and the magnetic domain control layers 2 and electrodes 3 are formed on only both side portions of the element which define the track width as shown in FIG. 4. As a result, the GMR element 1 and the electrodes 3 are electrically connected with each other at both ends in the track width direction, and uniform rotation of magnetization of the free layers in the GMR layer can be attained. The electrodes 3 are formed so as to be in contact with the magnetic domain control layers 2. In addition, the electrodes 3 may sometimes have electrically conductive underlying layers such as Cr or Ta layers at the portions contacting the magnetic domain control layers 2.

In A'-A section, as shown in FIG. 4(b), the GMR element 1, the magnetic domain control layers 2 and the electrodes 3 are stacked in this order. On the other hand, in B'-B section, only the GMR element 1 is formed, the state of which is the same as in FIG. 3(c). The reason why the thickness of the GMR element 1 in A'-A section is smaller than that in B'-B section is that the GMR element 1 in the portions where the electrodes 3 are formed are etched halfway as noted earlier.

Figure 5:
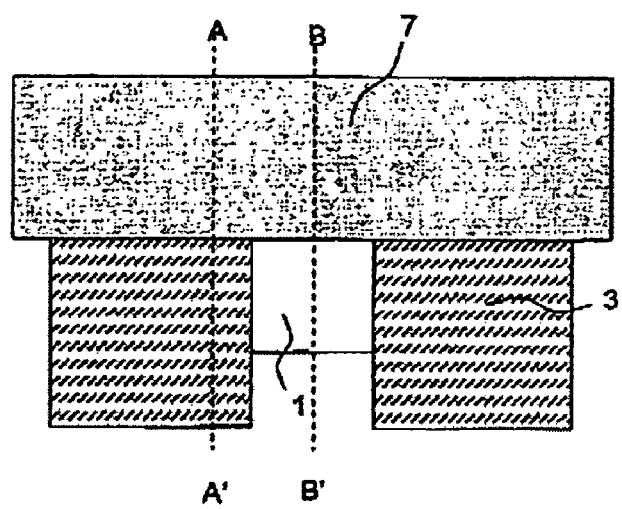
FIG. 5 shows a plan view and a sectional view showing how to form a photoresist for tapering the electrodes in the first embodiment.
Figure 5:
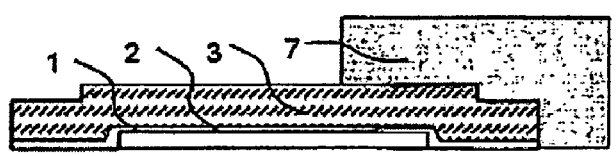
Figure 5:
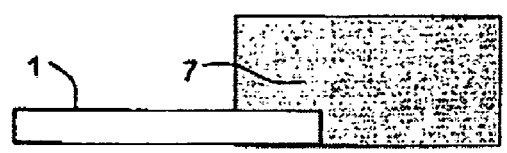

Next, as shown in FIG. 5, a photoresist 7 is formed at a desired portion and is tapered to taper the portions of the electrodes 3. This process also determines a lower end of the GMR element 1 in the vertical direction thereof. A conventional novolak resin-based photoresist is used as a resist, which has a thickness of 200 nm. The photoresist is applied by spin coating. In this case, since the underlayer to which the photoresist is to be applied has a difference in height of concave and convex, the photoresist is thin in the upper portion of that stepped portion as shown in A'-A section (FIG. 5(b)) and is thick in the lower portion of the stepped portion as shown in B'-B section (FIG. 5(c)). In the illustrated construction, the photoresist is 100 nm thick in the upper portion of the stepped portion and is 250 nm in the lower portion of the stepped portion.

Figure 6:
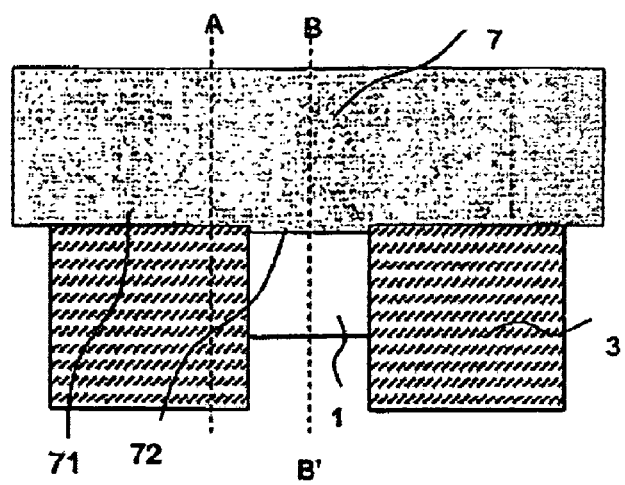
FIG. 6 shows a plan view and a sectional view showing a state after heat treatment of the photoresist for tapering the electrodes in the first embodiment.
Figure 6:
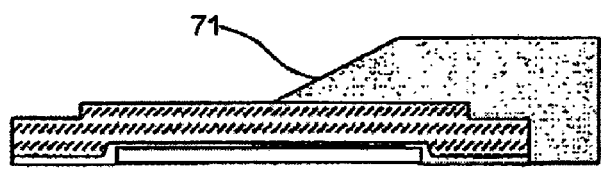
Figure 6:
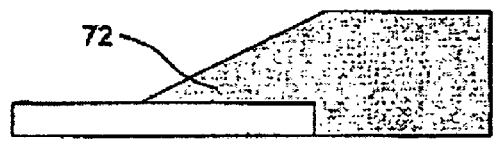

Subsequently, the photoresist is softened thermally to taper the resist section. This heat treatment is conducted at 150° C. FIG. 6 shows the shape of the photoresist after the heat treatment. The section of the photoresist is in a tapered shape having a gradient of about 30 degrees. A tapered portion 72 of the thick B'-B section of the photoresist shown in FIG. 6(c) flows up to a front end so that the front end is positioned ahead of a tapered portion 71 of A'-A section shown in FIG. 6(b).

Next, with this tapered photoresist as a mask, the electrodes 3 and the GMR element 1 are etched by ion milling. The resulting planar shape is shown in FIG. 7(a). FIGS. 7(b) and 7(c) show A'-A section and B'-B section, respectively, in FIG. 7(a). The electrodes 3 formed at both ends of the GMR element 1 in the track thickness direction thereof each comprise a portion 31 reduced in thickness by etching, a portion 3 left unetched as a result of having been covered with the photoresist, and a tapered portion 4 formed at a boundary between the electrode 3 and the portion 31. The GMR element 1 comprises an unetched portion and a tapered portion 11. The front end positions of the tapered portions also vary depending on the difference in front end position of the photoresist. The taper position of the GMR element 1 is ahead of the taper position of the electrode 3.

Figure 7:
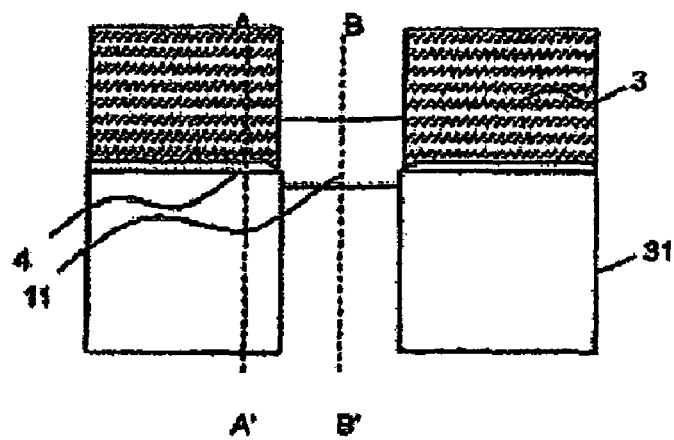
FIG. 7 shows a plan view and a sectional view showing an etched state of the electrodes and the GMR element in the first embodiment.
Figure 7:
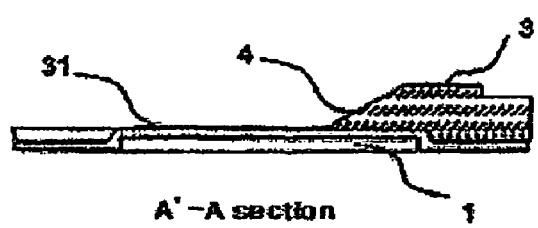
Figure 7:
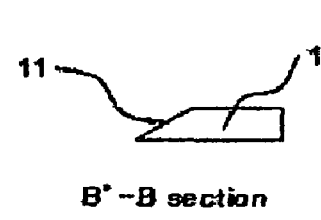
Figure 7:
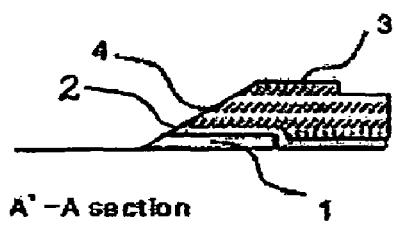
Figure 7:
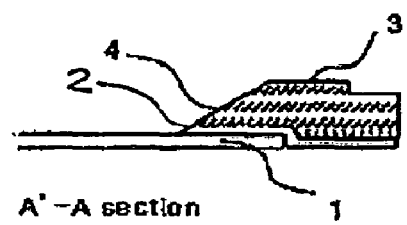
Figure 8:
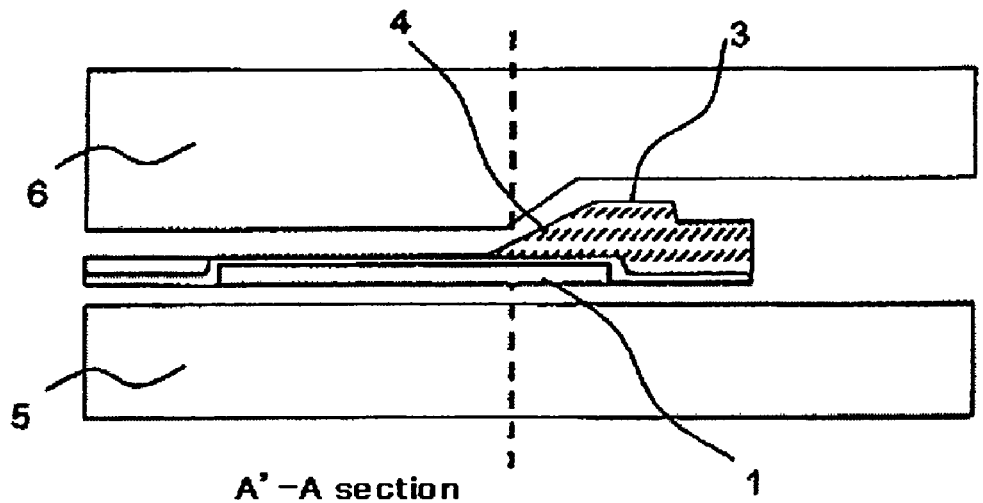
FIG. 8 is a sectional view taken on line A'-A in FIG. 7 in the first embodiment.
Figure 9:
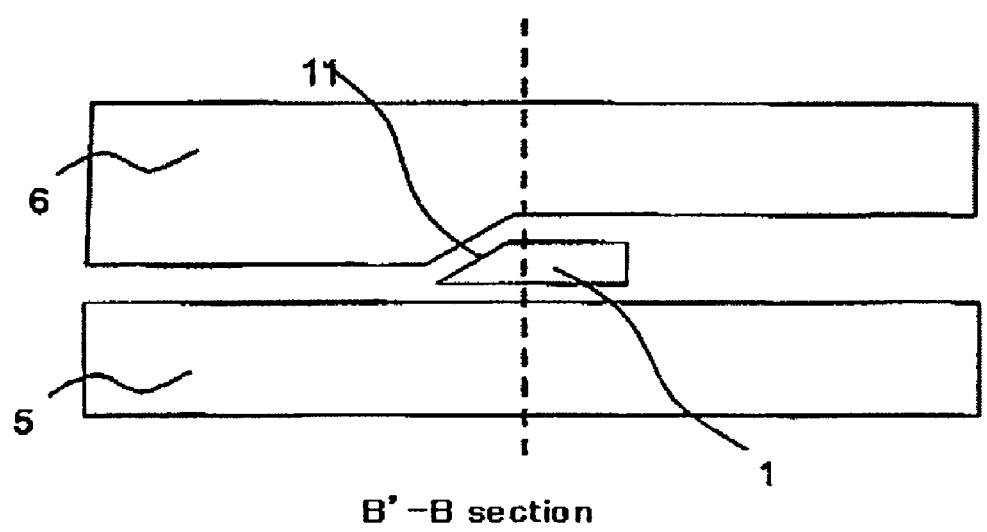
FIG. 9 is a sectional view taken on line B'-B in FIG. 7 in the first embodiment.
Figure 10:
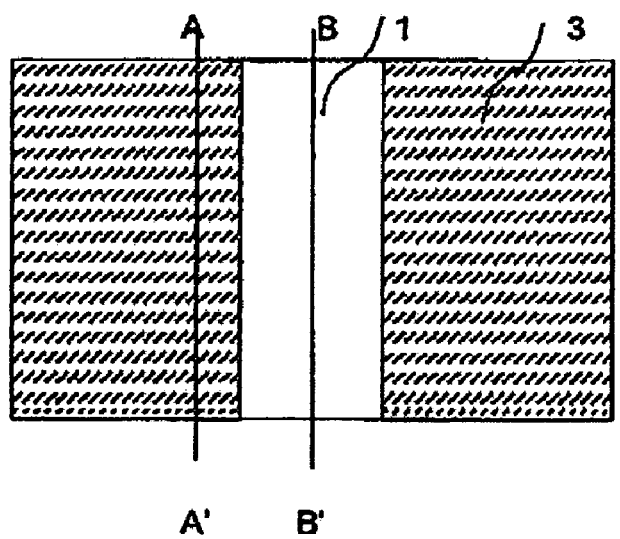
FIG. 10 shows a plan view and a sectional view showing a state in which electrodes and magnetic domain control layers are stacked at both ends of a GMR element in a second embodiment of the present invention.
Figure 10:
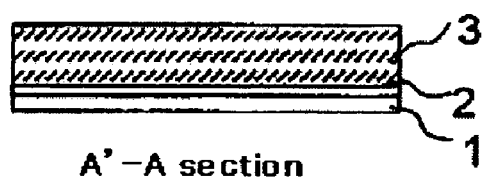
Figure 10:

After the electrodes 3 and the GMR element 1 are formed as above, an insulating layer is stacked thereon to a thickness of 15 nm and an upper magnetic shield 6 is formed thereover by a plating method. In this case, sectional views corresponding to A'-A and B'-B sections in FIG. 7 are shown in FIGS. 8 and 9, respectively. The insulating layer and the magnetic shield layer 6 formed by plating follow the tapered portion of the electrode which is the underlayer and the tapered portion of the GMR film. The tapered portion 4 as part of the electrode is therefore covered with the magnetic shield 6, as shown in FIG. 8.

A write head is fabricated onto the read head having the above construction, whereby the wafer process is completed. In the write head fabricating process, a lower magnetic pole, a coil and an upper magnetic pole are formed in this order, but the description of this process will be omitted in this embodiment.

After the end of the wafer process; slider work is started. Polishing is performed to form an air bearing surface, and sliders are cut out. In this process, the height of the GMR element is reduced by polishing in order to cause the GMR element to be exposed to the air bearing surface. At this time, polishing is performed simultaneously for both the electrode 3 shown in FIG. 8 and the GMR element 1 shown in FIG. 9 up to broken-line portions indicated in those figures, allowing the GMR element 1 to be exposed to the air bearing surface. At this time, the portion concerned of the electrode 3 is the tapered portion as is seen from FIG. 8 and therefore the air bearing surface side of the electrode 3 is covered with the magnetic shield 6. Thus, as viewed from the air bearing surface, as shown in FIG. 1, the magnetic shield 6 is present also in the electrode forming portions and there is no expanse of the magnetic shield spacing, whereby magnetic shields having a substantially uniform spacing are formed.

Although in this embodiment a photoresist is softened thermally and subjected to ion milling so as to be tapered, even a photoresist having a steep angle can be tapered in ion milling without thermal softening. The incidence angle of ion may be shifted several degrees from perpendicularity relative to the film to be etched and fixed milling may be performed in this state. In this case, by using a shadowing effect which utilizes a difference in resist height, it is possible to taper the photoresist. Moreover, by utilizing the fact that the photoresist thickness differs depending on place, it is possible to change the front end position of taper. Further, in the slider work, by performing polishing for each individual slider, a polishing quantity which affords a proper magnetic shield shape can be attained for each slider.

Although in the above embodiment only each electrode portion is tapered, both the section of each electrode and that of the magnetic domain control layer which underlies the electrode can be tapered by the same method as above. In this case, like the electrode structure described above, the magnetoresistive element at the air bearing surface is formed thinner than the thickest portion of each magnetic domain control layer as shown in FIG. 7(d).

Additionally, also in the case where only magnetic domain control layers which also serve as electrodes are connected to end portions of a GMR film, it is possible to form tapered sections by the same technique as above as shown in FIG. 7(e) and attain magnetic domain control layers partially covered with magnetic shields.

Further, by controlling the front end position of the photoresist in this embodiment it is possible to make the magnetic shield spacing in the electrode portion narrower than that in the GMR element portions. In FIG. 7, this can be attained by keeping the tapered surface 4 of each electrode in A'-A section away from the position of the air bearing surface to increase the amount of etching of the electrode. Although at end portions etching is performed so as to allow part of the GMR element to remain in the above embodiment, magnetic domain control layers and electrodes can be formed after removal of all the GMR element.

A second embodiment of the present invention is shown in FIGS. 10 to 14. This second embodiment is characterized in that a front end portion of each electrode is tapered and that the process for determining the height of a GMR element is carried out at a time by the lithography technique using electron beam exposure.

FIG. 10(a) shows a planar structure in which electrodes 3 and magnetic domain control layers 2 are stacked at both ends of a GMR element 1 in the track width direction thereof. A'-A and B'-B sections in FIG. 10(a) are shown in FIGS. 10(b) and 10(c), respectively. A basic construction of this second embodiment is the same as the construction of FIG. 4 described in the first embodiment. However, unlike the construction of FIG. 4, the process for determining the height of the GMR element is not included. In addition, in the illustrated state, operations up to the process of forming electrodes and magnetic domain control layers for determining the track width on both sides of the GMR element have already been completed.

Figure 11:
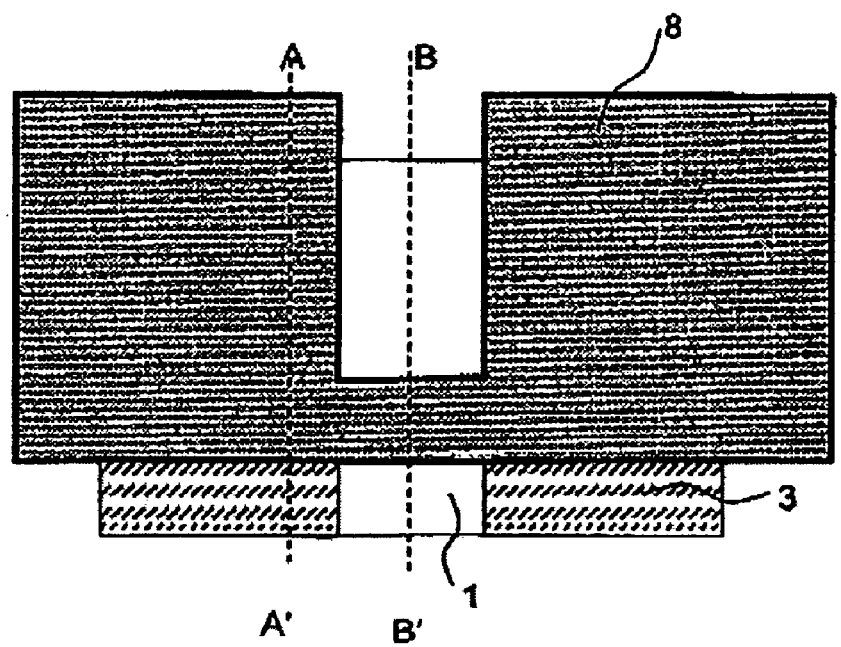
FIG. 11 shows a plan view and a sectional view showing a state in which a resist pattern is formed by the application of an electron beam resist in the second embodiment.
Figure 11:
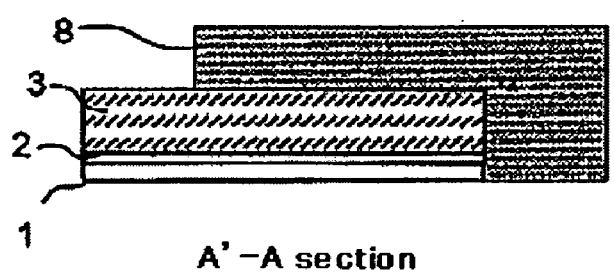
Figure 11:
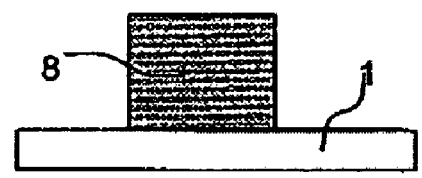
Figure 12:
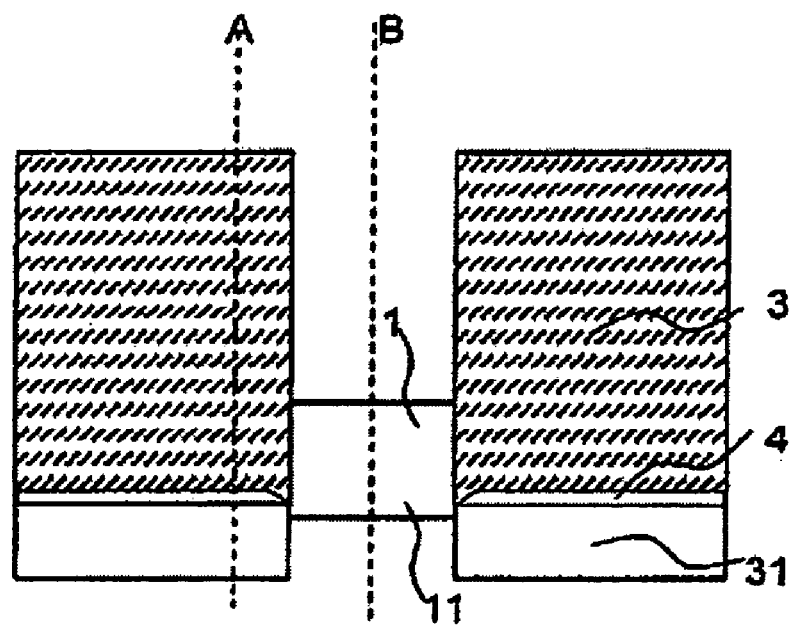
FIG. 12 shows a plan view and a sectional view of the GMR element showing a state after machining of the GMR element and electrodes followed by removal of the photoresist.
Figure 12:
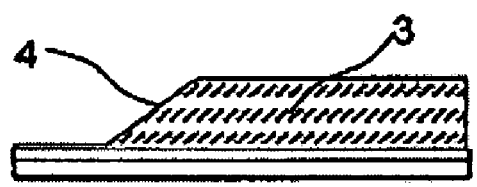
Figure 12:

Thereafter, as shown in FIG. 11, an electron beam resist is applied and exposure and development are performed so as to provide such a planar shape as shown in FIG. 11(a), thereby forming a resist pattern 8. In this process, to taper electrode portions and to remove a depth portion in the element height direction to determine the width in the height direction of the GMR element, the photoresist pattern is formed as a one-side-open-rectangular pattern. As shown in FIGS. 11(b) and 11(c), the photoresist 8 is thin at an upper portion of a stepped portion in A'-A section and thick at a lower portion of a stepped portion in B'-B section, as in the first embodiment. The incidence angle of Ar ion is inclined about 10 degrees relative to the substrate normal line and the GMR element 1 and the electrodes 3 are machined without allowing the substrate to rotate.

FIG. 12(a) shows a planar shape of the GMR element 1 after the machining followed by removal of the photoresist 8. A'-A and B'-B sections in FIG. 12(a) are shown in FIGS. 12(b) and 12(c), respectively. As is seen from the same figures, due to a shadowing effect, a tapered portion 4 is formed at a boundary between an etched region 31 and an unetched region 3 of each electrode 3, and a tapered portion 11 of the GMR element 1 is positioned near the air bearing surface with respect to the tapered portion 4 of the electrode.

Figure 13:
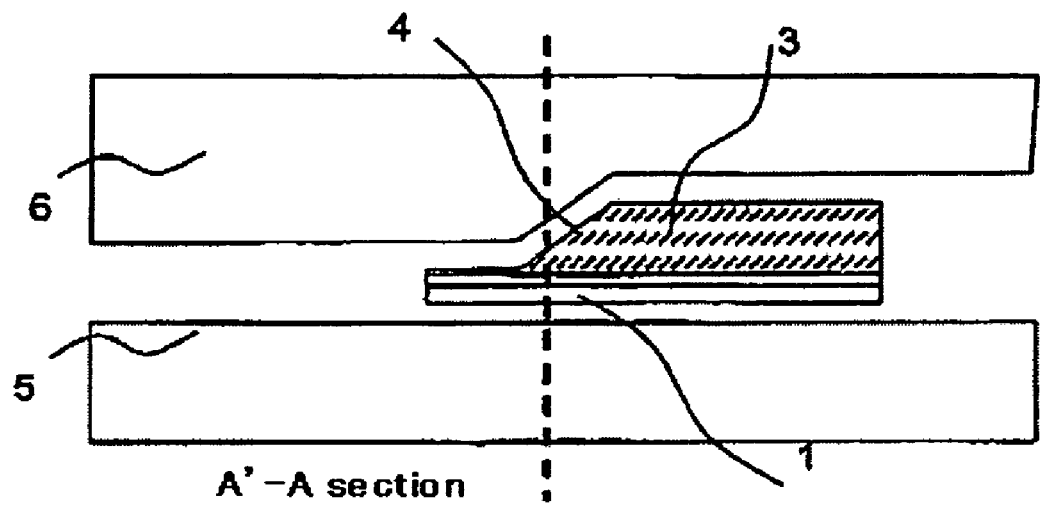
FIG. 13 is a sectional view taken on line A'-A in FIG. 12 in the second embodiment.
Figure 14:
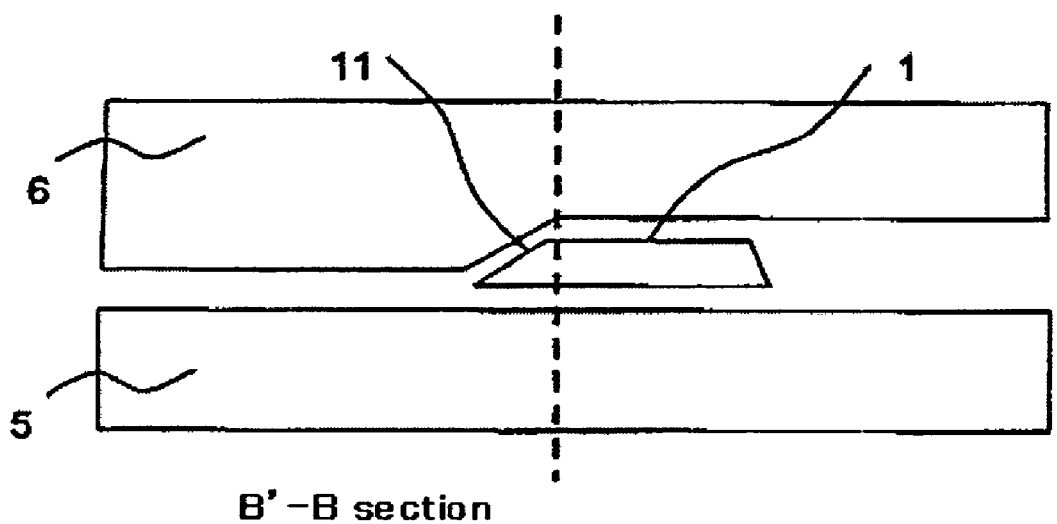
FIG. 14 is a sectional view taken on line B'-B in FIG. 12 in the second embodiment.
Figure 15:
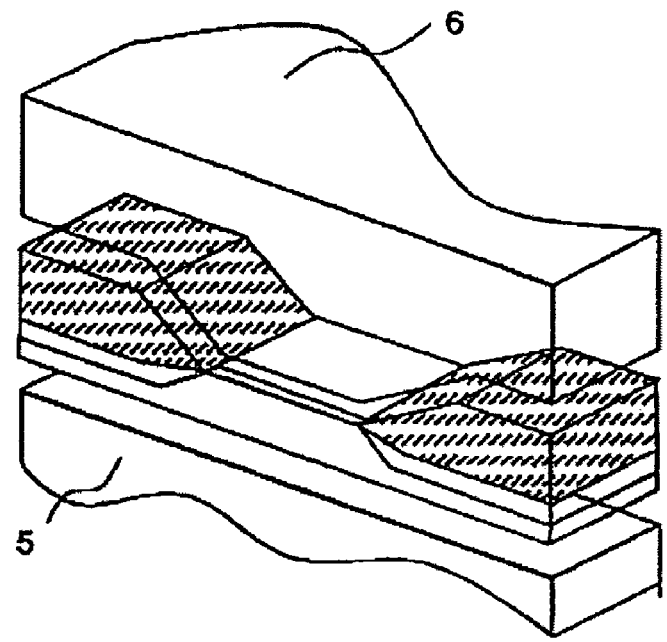
FIG. 15 is a perspective view showing a schematic structure of a conventional read head.
Figure 16:
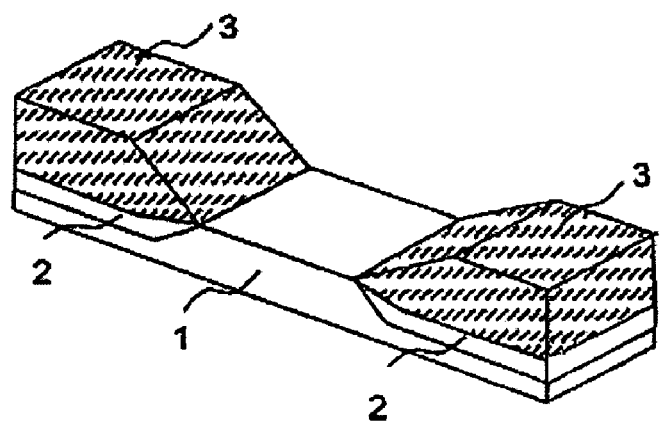
FIG. 16 is a perspective view showing a schematic structure of a conventional read element and the vicinity thereof.

FIGS. 13 and 14 are A'-A and B'-B sections respectively in which an insulating layer is stacked and a magnetic shield layer 6 is formed. It is seen that an end portion of each electrode is tapered and that when an air bearing surface is formed by a slider polishing process, the electrode portion is covered with magnetic shields in its broken line portion and the shield spacing is almost equal to that at the central part of the GMR element in the track width direction thereof. Thus, it turns out that also in this embodiment, by tapering end portions of the electrode layers on the air bearing surface side, the shield spacing could be kept narrow without widening even in the electrode portions at end portions of the GMR element.

Figure 17:
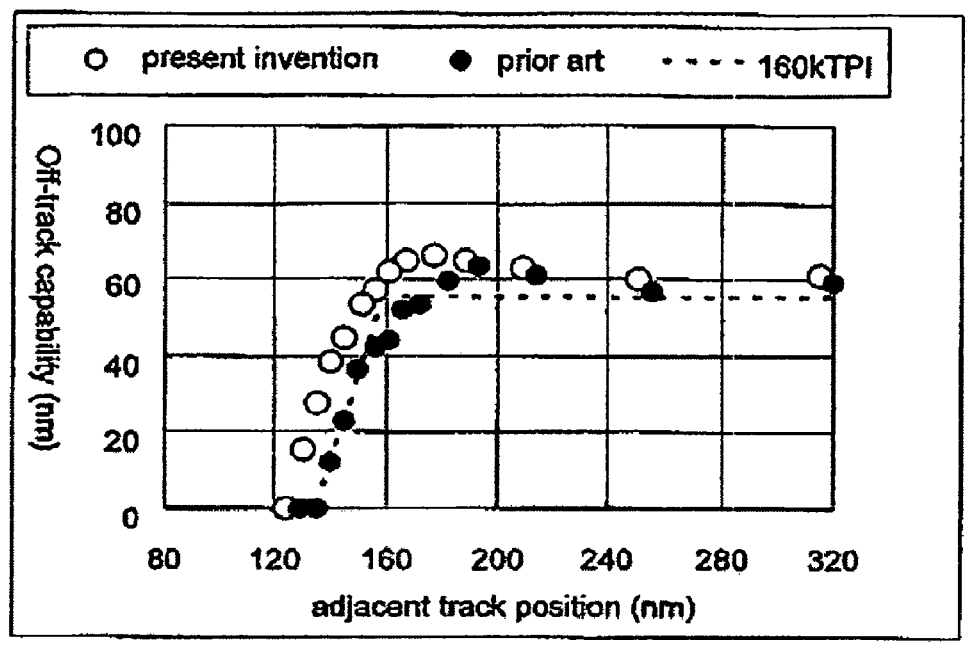
FIG. 17 shows off-track characteristics in a case of using the magnetic head of the first embodiment.

FIG. 17 shows the results of having evaluated off-track characteristics between the head of the first embodiment and a conventional head. The write track width is about 140 nm, the read track width is about 100 nm, and the spacing between upper and lower magnetic shields is about 60 nm. In the same figure, the filled circle mark represents the conventional head and the open circle mark represents the head of the first embodiment. The conventional head uses Rh as the electrode material and has a thickness of 50 nm. A magnetic shield angle at end portions of the GMR element which portions are in contact with electrodes is about 40 degrees, thus wider than the magnetic shield spacing at the central part. The electrodes used in the head of the first embodiment are also made of Rh and have a thickness of about 50 nm, but each have a tapered portion at least in an electrode range not exceeding 120 nm in the vicinity of the air bearing surface of the GMR element to prevent the magnetic shield spacing from becoming wider. A multi-layer medium of CoNiPtTa system is used as the medium. The broken line indicates a lower-limit off-track capability required in a case of the track density being 160 kTPI. It is seen that in the head of the first embodiment meets the condition of 160 kTPI and the narrowing of track can be attained even with respect to the same recording track width. This is probable because the expanse of the magnetic shields is small even at track end portions and therefore it was possible to decrease side reading of a signal in adjacent tracks. The probable reason is that since the electrodes need not be made extremely thin, a rise in head resistance is suppressed and the signal-to-noise ratio is little deteriorated. In addition, since there is no expanse of the magnetic shields at end portions in the track width direction, it was possible to ensure required resolution.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   a lower magnetic shield;
   a magnetoresistive element formed over said lower magnetic shield;
   a pair of magnetic domain control layers formed at both ends in a track width direction of said magnetoresistive element to control magnetic domains of the magnetoresistive element;
   a pair of electrodes formed on and in contact with said magnetic domain control layers; and
   an upper magnetic shield formed over said magnetoresistive element and said electrodes through an insulating film;
   wherein, in a height direction which is perpendicular to an air bearing surface of said magnetoresistive element, the thickness of each of said electrodes at said air bearing surface is smaller than the thickness of a thickest portion of the electrode.

2. A magnetic head according to claim 1, wherein the thickness of each of said electrodes becomes minimum at said air bearing surface.

3. A magnetic head according to claim 1, wherein the thickness of the thickest portion of each of said electrodes is about 50 nm or more.

4. A magnetic head according to claim 1, wherein surfaces of said electrodes facing said air bearing surface are tapered.

5. A magnetic head according to claim 1, wherein said electrodes and said magnetic domain control layers are used in common.

6. A magnetic head according to claim 1, wherein said electrodes have electrically conductive underlying layers at portions thereof in contact with said magnetic domain control layers.

7. A magnetic head comprising:
   a lower magnetic shield;
   a magnetoresistive element formed over said lower magnetic shield;
   a pair of magnetic domain control layers provided on side faces of said magnetoresistive element to control a magnetic field of the magnetoresistive element;
   a pair of electrodes formed on and in contact with said magnetic domain control layers to apply an electric current to said magnetoresistive element; and
   an upper magnetic shield formed over said magnetoresistive element and said electrodes through an insulating film;
   wherein, in a height direction which is perpendicular to an air bearing surface of said magnetoresistive element, a difference in height between an upper magnetic shield and an upper surface of a magnetoresistive element at air bearing surface portions where electrodes are provided is shorter than a difference in height between an upper surface of a thickest portion of each of the electrodes and the upper surface of the magnetoresistive element.

8. A magnetic head according to claim 7, wherein, in said height direction, the distance between said upper magnetic shield and said lower magnetic shield over each of said electrodes at the air bearing surface is shorter than the distance between an upper surface of the thickest portion of the electrode and the lower magnetic shield.

9. A magnetic head according to claim 7, wherein said electrodes and said magnetic domain control layers are used in common.

10. A magnetic head according to claim 7, wherein said electrodes have electrically conductive underlying layers at portions thereof in contact with said magnetic domain control layers.

* * * * *

UNITED STATES PATENT AND TRADEMARK OFFICE
CERTIFICATE OF CORRECTION

| | |
|---|---|
| PATENT NO. | : 7,586,715 B2 |
| APPLICATION NO. | : 11/336185 |
| DATED | : September 8, 2009 |
| INVENTOR(S) | : Koyama et al. |

It is certified that error appears in the above-identified patent and that said Letters Patent is hereby corrected as shown below:

Title page, (56) References Cited, column 2, line 14, please add:

FOREIGN PATENT DOCUMENTS

JP 01-025431    01/1999

JP 06-060326    03/1994

JP 2002-203304    07/2002

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,586,715 B2
APPLICATION NO. : 11/336185
DATED : September 8, 2009
INVENTOR(S) : Koyama et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Twenty-first Day of September, 2010

David J. Kappos
*Director of the United States Patent and Trademark Office*